(12) United States Patent
Ekelund

(10) Patent No.: US 11,401,904 B2
(45) Date of Patent: Aug. 2, 2022

(54) METHOD FOR CONTROLLING AN AUTO-STOP START SYSTEM OF A VEHICLE

(71) Applicant: Ningbo Geely Automobile Research & Development Co., Ltd., Ningbo (CN)

(72) Inventor: Johan Ekelund, Gothenburg (SE)

(73) Assignee: NINGBO GEELY AUTOMOBILE RESEARCH & DEVELOPMENT CO., Ningbo (CN)

(*) Notice: Subject to any disclaimer, the term of this patent is extended or adjusted under 35 U.S.C. 154(b) by 0 days.

(21) Appl. No.: 17/235,601

(22) Filed: Apr. 20, 2021

(65) Prior Publication Data

US 2021/0239083 A1    Aug. 5, 2021

Related U.S. Application Data

(63) Continuation of application No. PCT/CN2019/116169, filed on Nov. 7, 2019.

(30) Foreign Application Priority Data

Nov. 12, 2018 (EP) .................................... 18205708

(51) Int. Cl.
*F02N 11/08* (2006.01)
*B60Q 9/00* (2006.01)

(52) U.S. Cl.
CPC ............ *F02N 11/0822* (2013.01); *B60Q 9/00* (2013.01); *F02N 11/0833* (2013.01); *F02N 2200/0801* (2013.01)

(58) Field of Classification Search
CPC ............ F02N 11/0822; F02N 11/0833; F02N 2200/0801; F02N 2200/102; B60Q 9/00; Y02T 10/40; B60K 2370/161; B60K 2370/1464; B60K 35/00; B60K 37/06; F02D 2041/228
See application file for complete search history.

(56) References Cited

U.S. PATENT DOCUMENTS

| 2014/0081561 | A1 | 3/2014 | Be et al. |
| 2014/0278019 | A1* | 9/2014 | Be ...................... F02N 11/0818 701/112 |
| 2016/0304096 | A1* | 10/2016 | Khafagy ............ B60W 40/076 |

(Continued)

FOREIGN PATENT DOCUMENTS

| CN | 104553795 A | 4/2015 |
| CN | 105313874 A | 2/2016 |

(Continued)

OTHER PUBLICATIONS

International Search Report from corresponding International Application No. PCT/CN2019/116169, dated Feb. 5, 2020, 3 pages.

(Continued)

*Primary Examiner* — Sizo B Vilakazi
(74) *Attorney, Agent, or Firm* — Tucker Ellis LLP

(57) ABSTRACT

A method for controlling an auto-stop start system of a vehicle includes sending a message to an operator of the vehicle requesting the operator to perform an action for enabling activation of an auto-stop start function of the auto-stop start system, and provided that such a requested action is identified to have been performed, enabling activation of the auto-stop start function.

9 Claims, 2 Drawing Sheets

(56) References Cited

U.S. PATENT DOCUMENTS

2018/0238290 A1* 8/2018 Siddiqui ............... F02D 41/042
2018/0312171 A1* 11/2018 Okitsu ................ B60W 30/192

FOREIGN PATENT DOCUMENTS

| CN | 105465352 A | 4/2016 |
|---|---|---|
| CN | 105799704 A | 7/2016 |
| CN | 106274908 A | 1/2017 |
| CN | 106335510 A | 1/2017 |
| DE | 10211464 A1 | 9/2003 |
| IN | 201621011467 A | 11/2017 |
| JP | 2004232475 A | 8/2004 |

OTHER PUBLICATIONS

International Preliminary Report on Patentability from corresponding International Application No. PCT/CN2019/116169, dated Feb. 9, 2021, 7 pages.

* cited by examiner

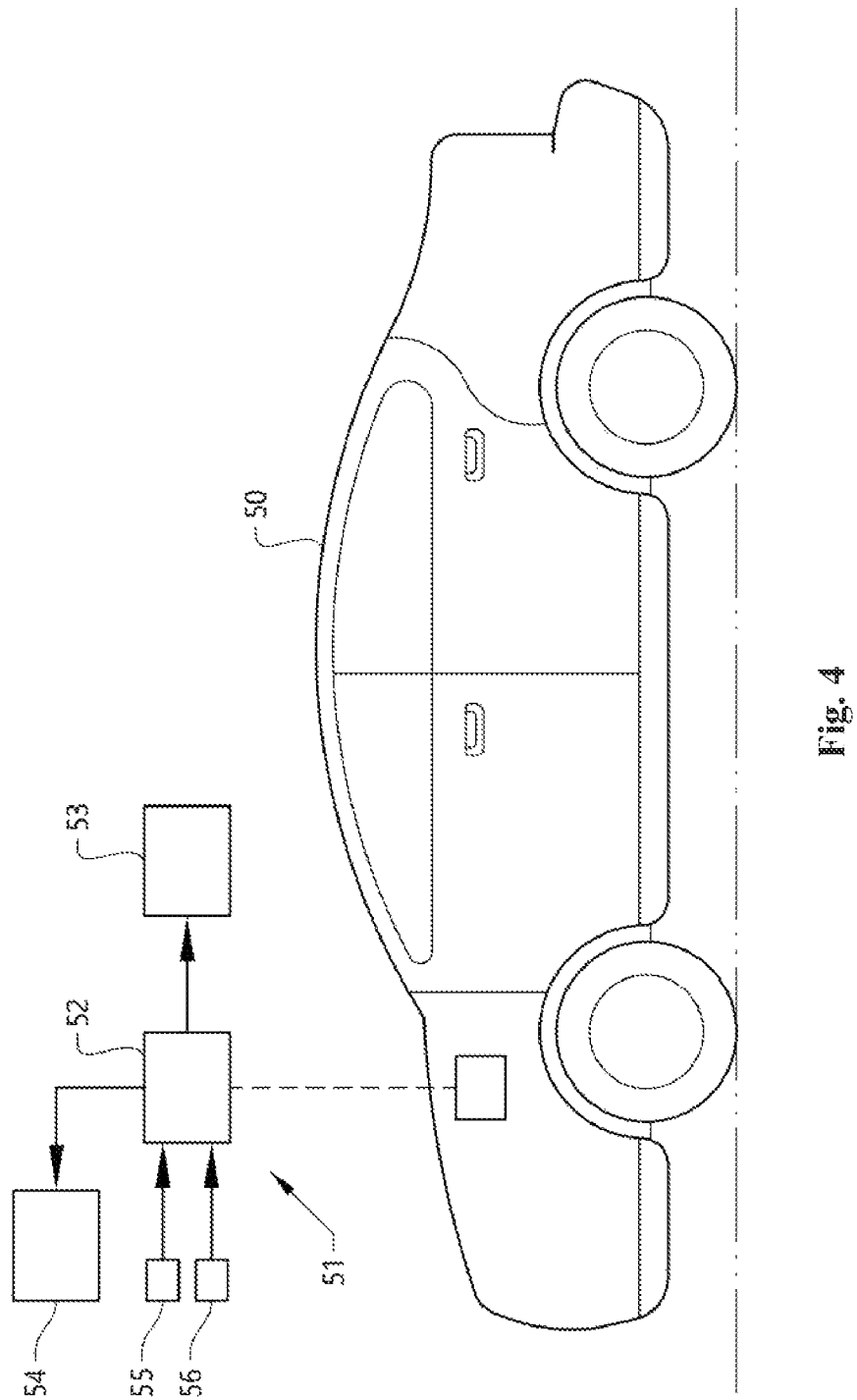

METHOD FOR CONTROLLING AN AUTO-STOP START SYSTEM OF A VEHICLE

RELATED APPLICATION DATA

This application is a continuation of International Patent Application No. PCT/CN2019/116169, filed Nov. 7, 2019, which claims the benefit of European Patent Application No. 18205708.3, filed Nov. 12, 2018, the disclosures of which are incorporated herein by reference in their entireties.

TECHNICAL FIELD

The invention relates to a method for controlling an auto-stop start system of a vehicle. In addition, the invention relates to a control unit for controlling an auto-stop start system.

BACKGROUND

An auto-stop start system of a vehicle is often used for reducing fuel consumption and emissions from an internal combustion engine by reducing the time the engine is idling. The system will automatically stop and start the engine provided that some predetermined conditions are fulfilled. Typically, the engine is stopped when it is predicted that the vehicle will be stationary for a longer amount of time. For example, the engine is stopped when the vehicle is waiting at traffic lights or when the vehicle frequently comes to a stop in traffic jams.

The effectiveness of such an auto-stop start system is however dependent on the traffic situation. The amount of time the vehicle actually remains stationary will have a great impact on the effectiveness of the system. Should the system stop and start to often, not only can the emissions increase, but it can cause annoyance to the driver due to a delayed power response when the driver requests acceleration. In addition, extensive stop and start repetitions will cause increased wear on several components, such as battery, starter motor and will have an impact on the lubrication of the engine.

SUMMARY

An objective of the invention is to provide a method for controlling an auto-stop start system of a vehicle, by which method the use of the system can be improved.

The objective is achieved by a method for controlling an auto-stop start system of a vehicle, where the method comprises the steps of sending a message to an operator of the vehicle requesting the operator to perform an action for enabling activation of an auto-stop start function of the auto-stop start system, and provided that such a requested action is identified to have been performed, enabling activation of the auto-stop start function.

The auto-stop start function is suitably a function comprising the step of turning off an engine of the vehicle provided that some conditions are fulfilled.

The invention is based on the insight that by such a method, the operator or driver is able to choose when the auto-stop start function should be used, enabling the engine to be turned off by the system. Hereby, undesired stops such as stops caused by miss-detections and intermediate engine stops in very slow moving traffic, can be reduced. This in turn can lead to reduced fuel consumption, less emissions and also to an improved traffic flow.

It should be stressed that the execution of the auto-stop start function suitably is associated with one or more other conditions usually applied for an auto-stop start function. Thus, by performing the requested action the operator can fulfil one condition for enabling activation of the auto-stop start function, but the execution of the function can still be prevented by other conditions which are not fulfilled.

The method preferably comprising the step of sending the message provided that the auto-stop start system is in an activated state. The auto-start stop system can often be turned off not offering the auto-stop start function to be used in situations where this function would have turned off the engine in a favourable way. By the invention, the operator can be more prone to keep the auto-stop start system activated, since it is still possible to choose when the auto-stop start function should be used.

The message can be provided to the operator by displaying the message, such as text or pictures, on a display of the vehicle. Another way of making the operator aware of any action to be performed for enabling activation of the auto-stop start function is sending out sound through loudspeakers of the vehicle.

According to one embodiment, the method comprises the step of measuring a velocity of the vehicle and provided that the measured vehicle velocity is below a threshold value, sending the message to the operator, and preferably sending the message provided that the vehicle has stopped. Hereby, the time point for sending the message can be closer to a situation where the auto-stop start function can be expected to be used, thereby avoiding sending such messages when not relevant.

According to another embodiment, the method comprises the step of requesting the operator to operate the vehicle in a predetermined way for enabling activation of the auto-stop start function. Although the action to be performed by the operator could be to instruct the system by means of voice control equipment for instance, operating of the vehicle, such as putting the gear lever in neutral or applying a certain brake pressure, is often favourable, since such an action can at the same time fulfil other conditions for execution of the function and/or coincide with the normal driving behaviour in situations when the auto-stop start function will be used.

According to a further embodiment, the method comprises the step of requesting the operator to apply a brake pressure above a threshold value for enabling activation of the auto-stop start function. Hereby, a natural way of responding to the message can be performed, since when activation of the function is relevant, the operator is often braking the vehicle, or the operator has recently been braking the vehicle.

According to a further embodiment, the method comprises the step of requesting the operator to increase a brake pressure for enabling activation of the auto-stop start function. Hereby, the requisite brake pressure can be adapted to a brake pressure currently applied by the operator by requesting a brake pressure corresponding to the currently applied brake pressure plus an additional pressure value.

According to a further embodiment, the method comprises the step of requesting the operator to apply the requested brake pressure during a time period longer than a predetermined time period for enabling activation of the auto-stop start function. By requesting the brake pressure for a certain time period, a safer response can be achieved while avoiding unintentional responses from the operator.

According to a further embodiment, the method comprises the step of measuring a brake pressure of the vehicle and requesting the operator to apply the requested brake pressure based on the measured brake pressure, and preferably measuring the brake pressure after a vehicle velocity below the vehicle velocity threshold value has been measured. Hereby, a relevant brake pressure at a time point where the auto-stop start function can be expected to be used can be requested.

In the above mentioned embodiments, where a certain brake pressure is requested, the operator is suitably requested to apply the requested brake pressure by pushing a brake pedal of the vehicle for enabling activation of the auto-stop start function.

According to another aspect of the invention, a further objective is to provide a control unit for controlling an auto-stop start system, by which control unit the use of the system can be improved.

This objective is achieved by a control unit for controlling an auto-stop start system, where the control unit is configured to send a message to an operator of the vehicle requesting the operator to perform an action for enabling activation of an auto-stop start function of the auto-stop start system, and provided that such a requested action is identified to have been performed, the control unit is configured to enable activation of the auto-stop start function.

In addition, the invention relates to a vehicle comprising such a control unit, and to a computer program comprising program code means for performing a method according to the invention.

The advantages of the control unit, the vehicle and the computer program are similar to the advantages already discussed hereinabove with reference to the different embodiments of the method.

Further advantages and advantageous features of the invention are disclosed in the following description and in the claims.

BRIEF DESCRIPTION OF THE DRAWINGS

With reference to the appended drawings, below follows a more detailed description of embodiments of the invention cited as examples.

In the drawings:

FIG. 4 shows a vehicle having an auto-stop start system and a control unit for controlling the auto-stop start system.

DETAILED DESCRIPTION

Figure 1:
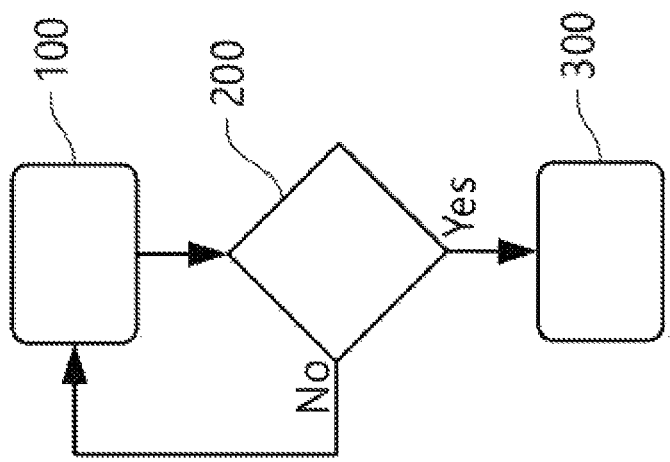
FIG. 1 is a flow chart illustrating a method for controlling an auto-stop start system.

FIG. 1 shows a flow chart illustrating one example embodiment of a method for controlling an auto-stop start system of a vehicle. The method comprises the step of sending 100 a message to an operator or driver of the vehicle requesting the operator to perform an action for enabling activation of an auto-stop start function of the auto-stop start system. Thereafter, the method comprises the step of checking 200 if such a requested action has been performed. Provided that such a requested action is identified to have been performed, i.e. if "YES" in FIG. 1, the method comprises the step of enabling 300 activation of the auto-stop start function. Otherwise, i.e. if "NO" in FIG. 1, the loop is closed and/or repeated until the requested action has been performed.

Figure 2:
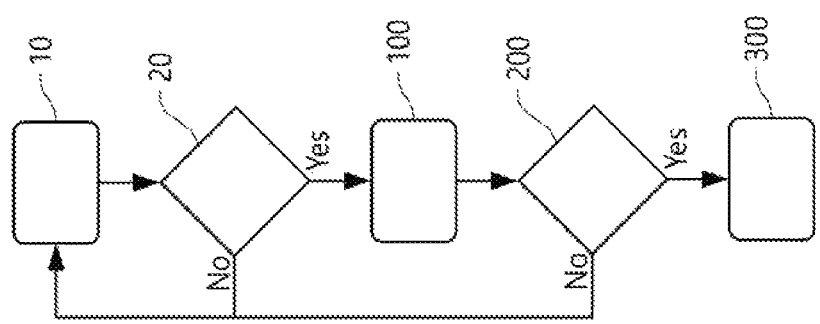
FIG. 2 is a flow chart illustrating a further embodiment of a method for controlling an auto-stop start system.

FIG. 2 shows a further example embodiment of the method for controlling an auto-stop start system of a vehicle. The method comprises the step of measuring 10 a velocity of the vehicle. Thereafter, the method comprises the step of checking 20 if the measured vehicle velocity is below a threshold value. Provided that the measured vehicle velocity is below the threshold value, i.e. if "YES" in FIG. 2, the method comprises the step of sending 100 the message to the operator of the vehicle requesting the operator to perform an action for enabling activation of an auto-stop start function of the auto-stop start system. Otherwise, i.e. if "NO" in FIG. 2, the loop is closed and/or repeated until the requested action has been performed. Thereafter, the subsequent method steps 200, 300 are similar to the steps already described with reference to FIG. 1.

The vehicle velocity threshold value can be for example 10 km/h, preferably 5 km/h or requiring the vehicle to be stopped, i.e. the vehicle velocity should be 0 km/h.

Figure 3:
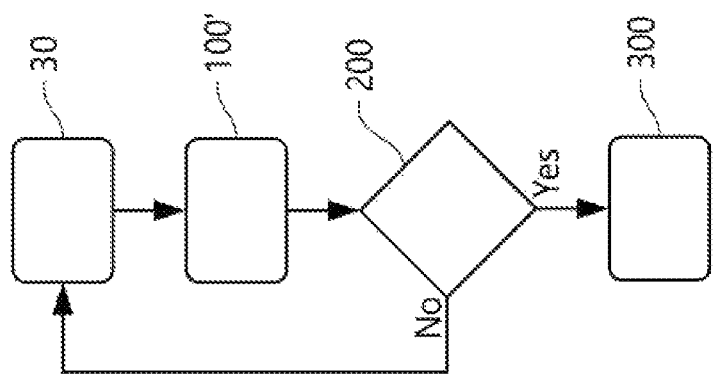
FIG. 3 is a flow chart illustrating a further embodiment of a method for controlling an auto-stop start system.

FIG. 3 shows a further example embodiment of the method for controlling an auto-stop start system of a vehicle. The method comprises the step of measuring 30 a brake pressure of the vehicle and sending 100' a message to an operator of the vehicle requesting the operator to apply a requested brake pressure based on the measured brake pressure. Thereafter, the subsequent method steps 200, 300 are similar to the method steps already described with reference to FIGS. 1 and 2.

The example embodiment illustrated in FIG. 3 can be combined with the embodiment illustrated in FIG. 2. In such a case, the method suitably comprises the step of measuring the brake pressure after a vehicle velocity below the vehicle velocity threshold value has been measured.

For the embodiment examples described herein, the method preferably comprises the step of sending the message requesting the operator to operate the vehicle in a predetermined way for enabling activation of the auto-stop start function. For example, the operator can be requested to apply a brake pressure above a threshold value and/or to increase a brake pressure for enabling activation of the auto-stop start function. Optionally, the operator can be requested to apply the requested brake pressure during a time period longer than a predetermined time period for enabling activation of the auto-stop start function.

The message to the operator can be displayed on a display of the vehicle, which display can be arranged on the dashboard of the vehicle, and/or be communicated by a sound from a loudspeaker of the vehicle.

Although the auto-stop start system could comprise other functions, the auto-stop start function that the operator of the vehicle is able to activate by performing a requested action, preferably comprises the step of turning off an engine of the vehicle. The engine can be an internal combustion engine for driving the vehicle. Thus, the operator is able to allow activation of auto-stop of the engine for avoiding unnecessary idling of the engine or reject such activation of auto-stop.

In addition, the auto-stop start system could have an activated state wherein the message to the operator can be sent and a non-activated state (turned off) wherein such a message cannot be sent to the operator.

FIG. 4 shows a vehicle 50 having an auto-stop start system 51 and a control unit 52 for controlling the auto-stop start system 51. The control unit 52 is configured to send a message to an operator or driver of the vehicle requesting the operator to perform an action for enabling activation of an auto-stop start function of the auto-stop start system, and provided that such a requested action is identified to have been performed, enable activation of the auto-stop start function.

The control unit 52 may comprise one or more microprocessors and/or one or more memory devices or any other components for executing computer programs to perform the method. Thus, the control unit is preferably provided with a computer program comprising program code means for performing the steps of any example embodiment of the method described hereinabove. The control unit can be a separate component or be integrated in another controller of the vehicle.

As further schematically illustrated in FIG. 4, the control unit 52 can be arranged to transmit signals to a display unit 53 for controlling the display unit 53 and thereby communicate the message to the operator of the vehicle. The control unit 52 is also arranged to control the engine 54 of the vehicle 50 in a way enabling the engine 54 to be turned off provided that one or more predetermined conditions are fulfilled. The conditions can be associated with signals from one or more sensors 55, 56 of the vehicle 50. Such a sensor 55 can be used for checking if the requested action has been performed by the operator. For example, a sensor 55 for measuring the current brake pressure of a service brake of the vehicle 50 can be used for deciding on enabling activation of the auto-start stop function of the auto-stop start system 51. Other sensors 56 can be used for other conditions not requested by the message. For example, a sensor 56 for measuring the velocity of the vehicle 50 can be used for deciding on whether or not the message should be sent.

It is to be understood that the present invention is not limited to the embodiments described above and illustrated in the drawings; rather, the skilled person will recognize that many changes and modifications may be made within the scope of the appended claims.

What is claimed is:

1. A method for controlling an auto-stop start system of a vehicle, the method comprising:

sending a message to an operator of the vehicle, the message comprising a request for the operator to perform an action to enable activation of an auto-stop start function of the auto-stop start system, wherein the action of the request comprises applying a brake pressure above a predetermined threshold; and identifying that the operator has applied the brake pressure above the predetermined threshold and, in response, enabling the auto-stop start function.

2. The method according to claim 1, further comprising measuring a velocity of the vehicle and, provided that the measured vehicle velocity is below a threshold value, sending the message to the operator.

3. The method according to claim 2, further comprising sending the message provided that the vehicle has stopped.

4. The method according to claim 1, wherein the action of the request further comprises application of the brake pressure above the predetermined threshold for a time period longer than a predetermined time period.

5. The method according to claim 1, wherein the message is displayed on a display of the vehicle.

6. The method according to claim 1, wherein the auto-stop start function comprises turning off an engine of the vehicle.

7. A control unit for controlling an auto-stop start system, wherein the control unit is configured to send a message to an operator of the vehicle, the message comprising a request for the operator to perform an action to enable activation of an auto-stop start function of the auto-stop start system, wherein the action of the request comprises applying a brake pressure above a predetermined threshold; and identify that the operator has applied the brake pressure above the predetermined threshold and, in response, enable activation of the auto-stop start function.

8. A vehicle comprising a control unit according to claim 7.

9. A non-transitory computer readable medium storing a computer program comprising program code for performing the method according to claim 1.

* * * * *